United States Patent
Lee et al.

[11] Patent Number: 5,788,019
[45] Date of Patent: Aug. 4, 1998

[54] TWO-STEP BRAKE SYSTEM OF BICYCLE

[75] Inventors: Mike Lee; Thomas Lone, both of Chang Hua Hsien, Taiwan

[73] Assignee: Falcon Industrial Co., Ltd., Taichung Hsien, Taiwan

[21] Appl. No.: 834,742

[22] Filed: Apr. 3, 1997

[30] Foreign Application Priority Data

Jan. 24, 1997 [TW] Taiwan ................. 86201273

[51] Int. Cl.⁶ ................. B62L 1/00; B62L 3/00
[52] U.S. Cl. ................. 188/24.11; 188/24.19; 188/24.21
[58] Field of Search ................. 188/24.11, 24.12, 188/24.19, 24.21, 24.18, 2 D, 344

[56] References Cited

U.S. PATENT DOCUMENTS

| | | | |
|---|---|---|---|
| 4,765,443 | 8/1988 | Cunningham | 188/24.21 |
| 5,626,209 | 5/1997 | Viola | 188/24.21 X |
| 5,636,716 | 6/1997 | Sugimoto et al. | 188/24.19 X |
| 5,649,609 | 7/1997 | Li et al. | 188/24.19 |

FOREIGN PATENT DOCUMENTS 456893   9/1913   France ................. 188/24.21

*Primary Examiner*—Robert J. Oberleitner
*Assistant Examiner*—Pamela J. Lipka
*Attorney, Agent, or Firm*—Browdy and Neimark

[57] ABSTRACT

A bicycle two-step brake system is composed of two brake arms having a primary arm and a secondary arm fastened pivotally with the primary arm. The primary arm is fastened with the bicycle frame while the secondary arm is fastened with a brake cable of the brake lever. The primary arms are provided with a first drag portion and a brake shoe capable of being forced against the bicycle wheel rim so as to slow or stop the bicycle in motion. The secondary arms are provided with a second drag portion. Two elastic members are located between the primary arms and the secondary arms such that the elastic members enable the first drag portions and the second drag portions to have an outward bracing force capable of cooperating with a pulling force of the brake cable to cause the primary arms and the secondary arms to act independently or synchronously to bring about the two-step braking mechanism.

7 Claims, 4 Drawing Sheets

TWO-STEP BRAKE SYSTEM OF BICYCLE

FIELD OF THE INVENTION

The present invention relates generally to a bicycle brake system, and more particularly to a two-step brake system of the bicycle.

BACKGROUND OF THE INVENTION

The conventional bicycle brake system is generally composed of two brake shoes fastened with the brake arms such that the brake shoes can be forced against the rim of a bicycle wheel for slowing or stopping the motion of the bicycle wheel. As illustrated in FIG. 1, when a bicyclist triggers the brake lever, the grip force (F) and the lever stroke (S) increase in a linear proportion so as to enable the bicyclist to overcome the elastic force of the brake cable, as illustrated by the A line in FIG. 1. As the bicyclist has initially triggered the brake lever, he or she is not able to tell if the brake shoes have made contact with the rim until such time when the brake shoes have made an instant contact with the rim, as illustrated by the B point in FIG. 1. Thereafter, the grip force (F) of the brake lever increases rapidly, as illustrated by the C line in FIG. 1, until such time when the rim is locked up by the brake shoes, as illustrated by the D point in FIG. 1. In other words, the lever stroke (S) takes place in a relatively short period of time before the bicyclist is able to respond in time. Under such a circumstance, the bicycle in motion is rather vulnerable to tip-over, especially if the bicycle is equipped with a V-brake, which has a relatively longer lever of force. In short, the main culprit of the conventional bicycle brake system is attributable to the fact that the action of the brake arms is of a one-step response, and that the rim of the bicycle wheel in motion is thus locked up by the brake shoes in a rather short period of time.

SUMMARY OF THE INVENTION

It is therefore the primary objective of the present invention to provide a two-step brake system capable of slowing or stopping the motion of a bicycle wheel in a progressive manner.

It is another objective of the present invention to provide a two-step brake system capable of preventing the rim of a bicycle wheel from being locked up by the brake shoes in an abrupt manner so as to enable a bicyclist to maneuver the bicycle easily.

In keeping with the principle of the present invention, the foregoing objectives of the present invention are attained by a two-step brake system, which is intended for use in a bicycle and is composed of two symmetrical brake arms which are fastened respectively at one end thereof with a brake cable and are fastened pivotally and symmetrically at another end thereof with the bicycle frame such that the brake arms are located at both sides of the rim. Each of the brake arms has a primary arm and a secondary arm fastened pivotally with the primary arm which is provided at the center thereof with a brake shoe capable of being forced against the rim for slowing or stopping the motion of a bicycle wheel. The primary arm is provided with a first drag portion while the secondary arm is provided with a second drag portion. The primary arm and the secondary arm are provided therebetween with an elastic member capable of bringing about a two-step braking mechanism in conjunction with a pulling force of the brake cable.

The foregoing objectives, features, functions and advantages of the present invention will be more readily understood upon a thoughtful deliberation of the following detailed description of the embodiments of the present invention in conjunction with the accompanying drawings.

DETAILED DESCRIPTION OF THE INVENTION

Figure 1:
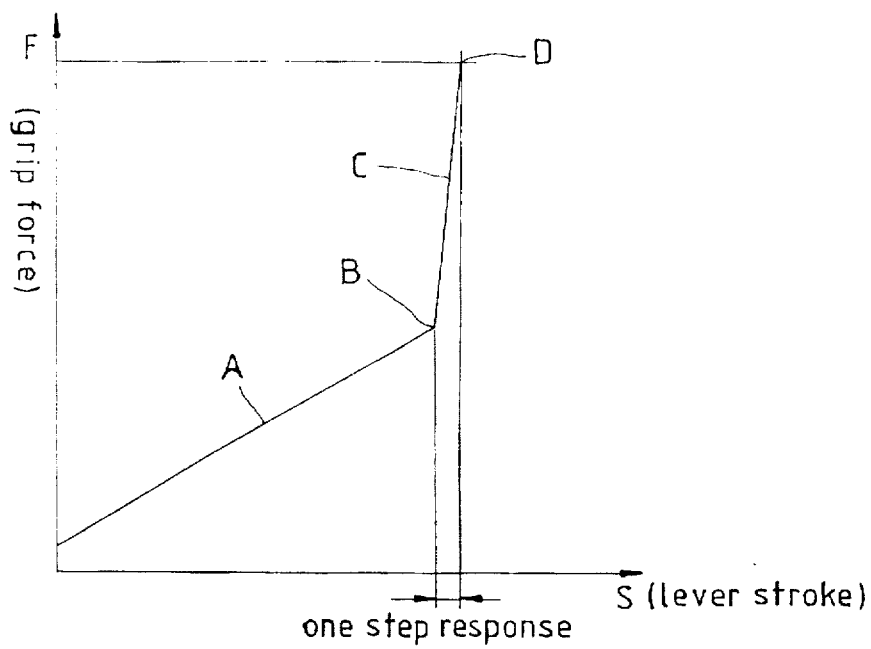
FIG. 1 illustrates the one-step braking mechanism of a bicycle brake system of the prior art.
Figure 2:
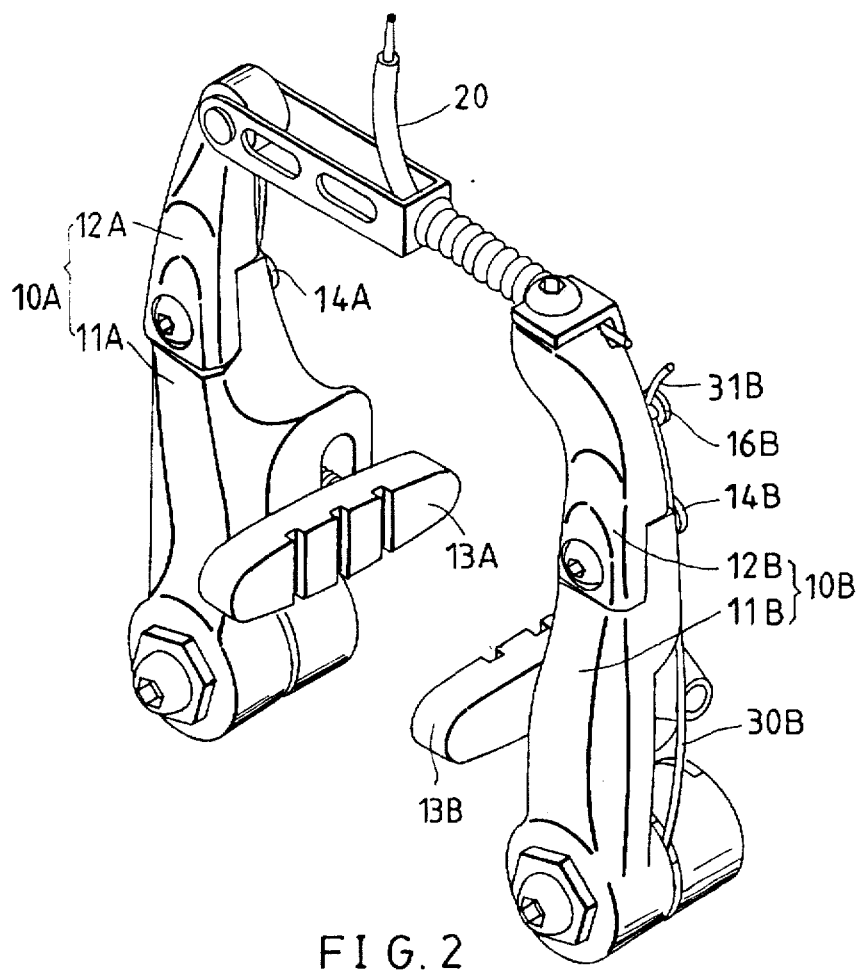
FIG. 2 shows a perspective view of a first preferred embodiment of the present invention.
Figure 3:
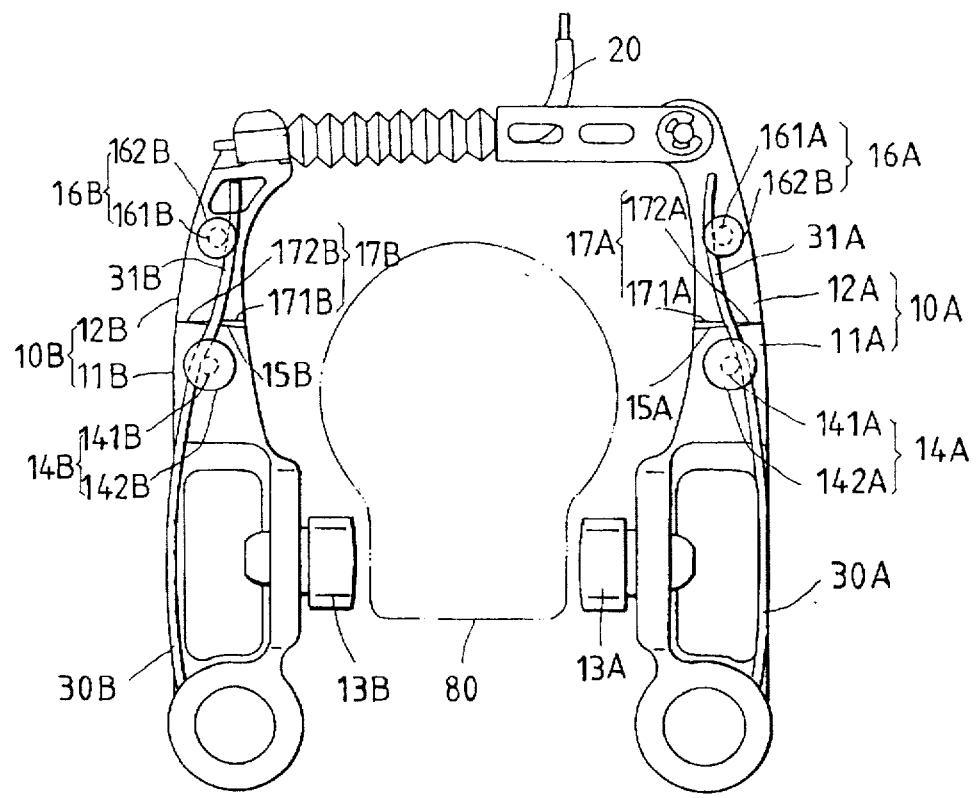
FIG. 3 is a schematic rear view of the present invention not in action.

As shown in FIGS. 2 and 3, a two-step brake system embodied in the present invention is intended for a bicycle and is composed of two brake arms 10A and 10B, which are arranged symmetrically and fastened with a brake cable 20 which is in turn fastened with a brake lever of the bicycle.

The brake arm 10A comprises a primary arm 11 A, a secondary arm 12A and an elastic member 30A while the brake arm 10B comprises a primary arm 11B, a secondary arm 12B and an elastic member 30B. The primary arms and the secondary arms of the brake arms 10A and 10B are fastened pivotally by the pivots 14A and 14B respectively. The pivots 14A and 14B have projections 141A, 141B, and stopping disks 142A, 142B. Two brake shoes 13A and 13B are fastened respectively with the primary arms 11A and 11B such that the brakes shoes 13A and 13B are capable of being forced against a rim of the bicycle for slowing or stopping the bicycle in motion. The primary arms 11A and 11B are provided with first drag portions 15A, 15B. The secondary arms 12A and 12B are fastened with the brake cable 20 and are provided with shafts 16A, 16B, which have projections 161A, 161B, and stopping disks 162A, 162B. The secondary arms 12A and 12B are further provided with second drag portions 17A, 17B, which are opposite in location to the first drag portions 15A, 15B respectively. The first and the second drag portions 15A, 15B, 17A and 17B have a linear stopping face. Located between the first drag portion and the second drag portion is a minute interstice. The second drag portions 17A and 17B have inner stopping faces 171A, 171B, and outer stopping faces 172A, 172B, respectively. The elastic members 30A, 30B are springs capable of forcing the brake arms 10A and 10B to return to their original positions. The elastic members 30A and 30B have extension portions 31A, 31B respectively. The extension portions 31A, 31B of the elastic member 30A, 30B are fitted respectively over the projections 141A, 141B of the pivots 14A, 14B such that the ends of the extension portions 31A and 31B urge the projections 161A, 161B of the secondary arms 12A, 12B, respectively. As a result, the elastic members 31A and 31B are capable of providing an outward bracing force between the primary arms 11A, 11B, and the secondary arms 12A, 12B such that the outer stopping faces 172A, 172B of the second drag portions 17A, 17B press against the first drag portions 15A, 15B of the primary arms 11A, 11B, at such time when the two-step brake system of the present invention is not activated, as shown in FIG. 3. The stopping disks 142A, 142B, 162A, 162B are intended for use in locating securely the elastic members 30A, 30B.

Figure 4:
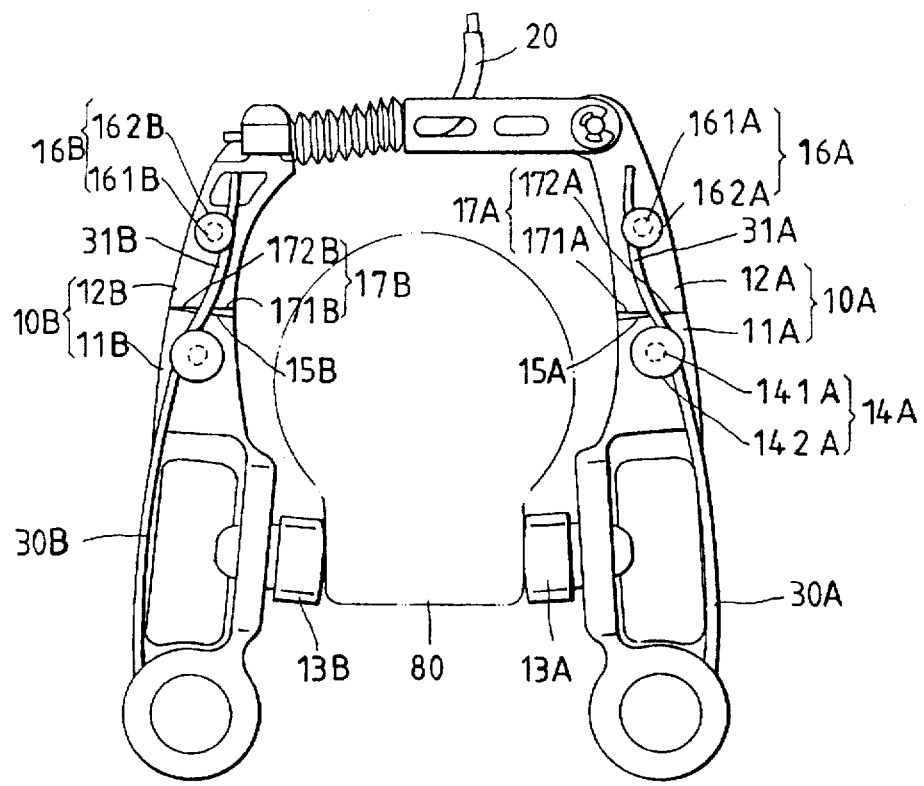
FIG. 4 is a schematic view illustrating the action of the two-step brake system of the present invention.
Figure 5:
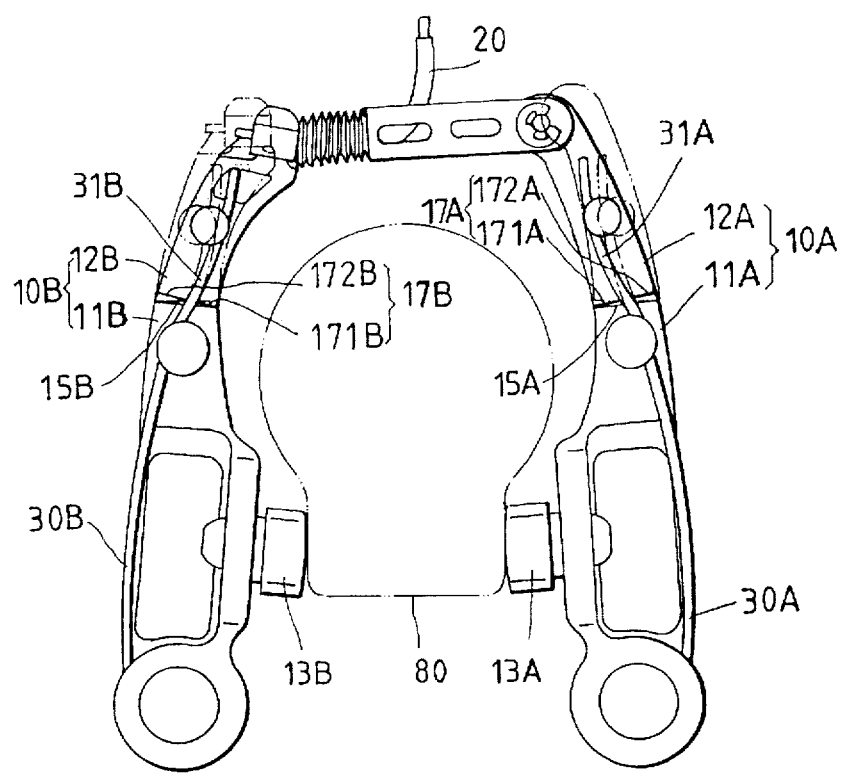
FIG. 5 is another schematic view illustrating the action of the two-step brake system of the present invention.
Figure 6:
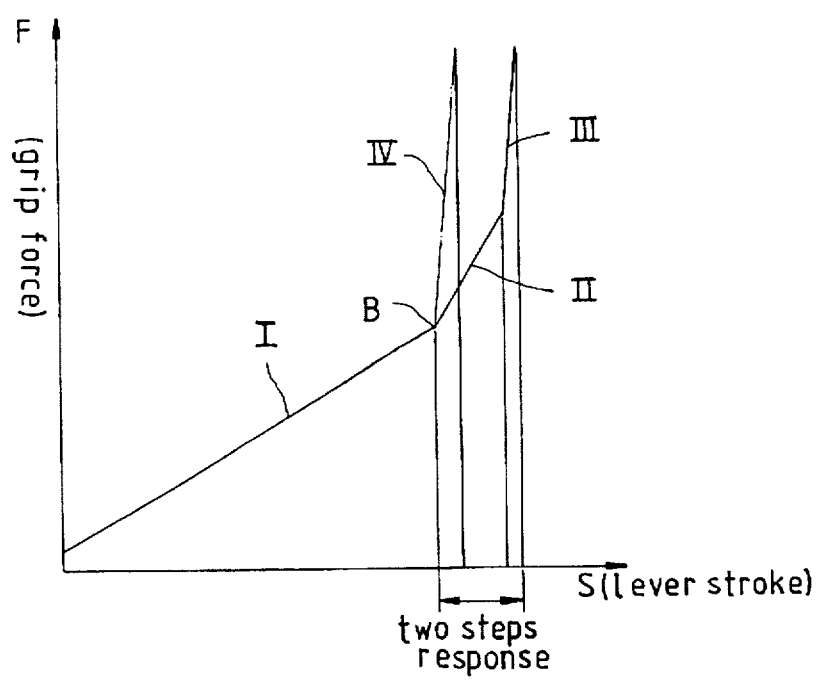
FIG. 6 illustrates the two-step braking mechanism of the bicycle brake system of the present invention.

Now referring to FIGS. 4-6 which illustrate the action of the two-step brake system of the present invention, the brake cable 20 is activated when the brake lever is triggered. The threshold pulling force of the brake cable is not greater than the outward bracing force of the primary and the secondary arms 11A, 12A 11B, 12B. As a result, the threshold pulling force of the brake cable 20 is capable of actuating the primary arms 11A, 11 B, and the secondary arms 12A, 12B to operate synchronously so as to force the brake shoes 13A and 13B to make contact with the rim 80 of a bicycle wheel, as illustrated in FIG. 4, as well as the point B in FIG. 6. In other words, the point B of FIG. 6 represents the threshold of the braking action of the two-step brake system of the present invention. The line designated by "I" in FIG. 6 represents the relationship between the grip force (F) of the brake lever and the lever stroke (S) of the brake lever.

Now referring to FIG. 5, as the grip force (F) persists, the pulling force of the brake cable 20 increases to an extent that the pulling force of the brake cable 20 overcomes the outward bracing force of the primary and the secondary arms 11A, 12A, 11B, 12B, and that the secondary arms 12A and 12B are forced to turn inwards in a gradual manner. As a result, a greater grip force is called for in relation to the lever stroke, as illustrated by the II line in FIG. 6. As the first-step response is completed, the second-step response is brought about by the action that the first drag portions 15A, 15B of the primary arms 11A, 11B are pressed against by the inner stopping faces 171A, 171B of the second drag portions 17A, 17B of the secondary arms 12A, 12B such that the primary and the secondary arms 11A, 12A, 11B and 12B act as a whole to swing inwards. As a result, the grip force that is called for in the second-step response in far greater than that of the first-step response, as illustrated by a steep m line in FIG. 6. The second-step response described above is corresponding to the entire braking action of the prior art brake system. In other words, the steep III line of the present invention is parallel to the steep IV line of the prior art, as shown in FIG. 6. It is therefore readily apparent that the two-step brake system of the present invention has inherent advantages over the one-step brake system of the prior art. In addition, the brake cable 20 of the present invention can be easily removed or replaced without a hand tool in view of the fact that the secondary arms 12A and 12B of the present invention can be still caused to swing slightly at the time when the brake shoes 13A and 13B made contact with the rim 80.

Figure 7:
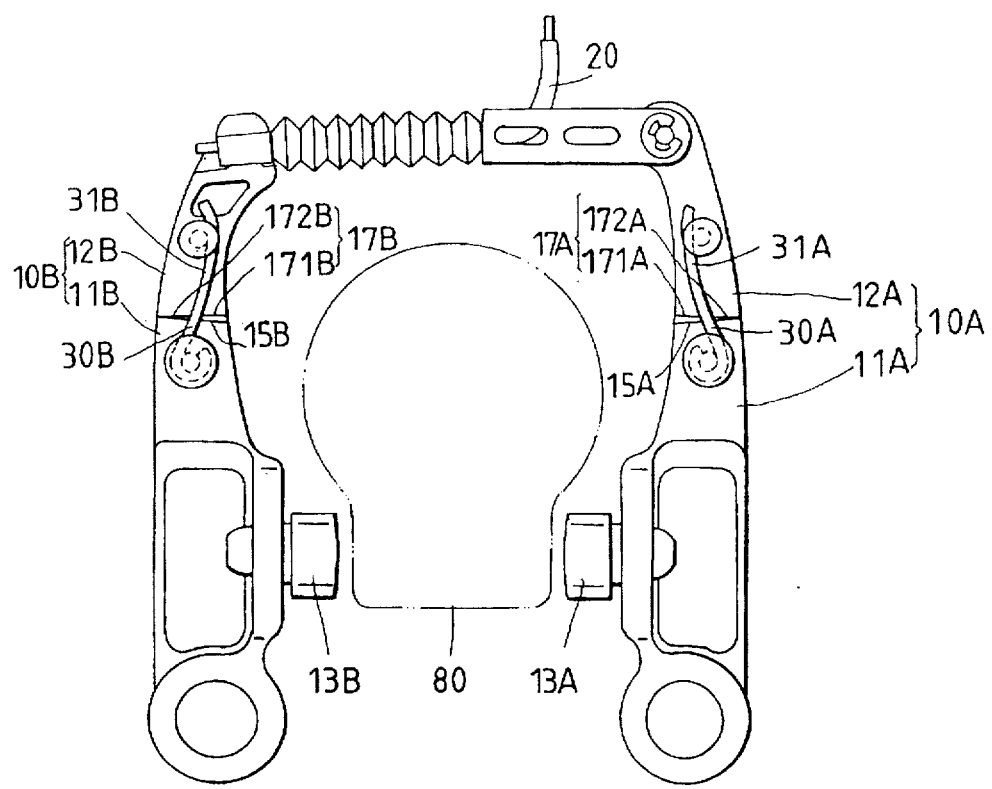
FIG. 7 shows a rear view of a second preferred embodiment of the present invention.

As shown in FIG. 7, the second preferred embodiment of the present invention is different from the first preferred embodiment of the present invention in that the former comprises the elastic members 30A and 30B, which are coiled springs fitted over the pivots 14A, 14B such that their extension portions 31 A, 31 B press against the shafts 16A, 16B of the secondary arms 12A, 12B so as to provide the primary and the secondary arms 11A, 12A, 11 B, 12A with an outward bracing force.

Figure 8:
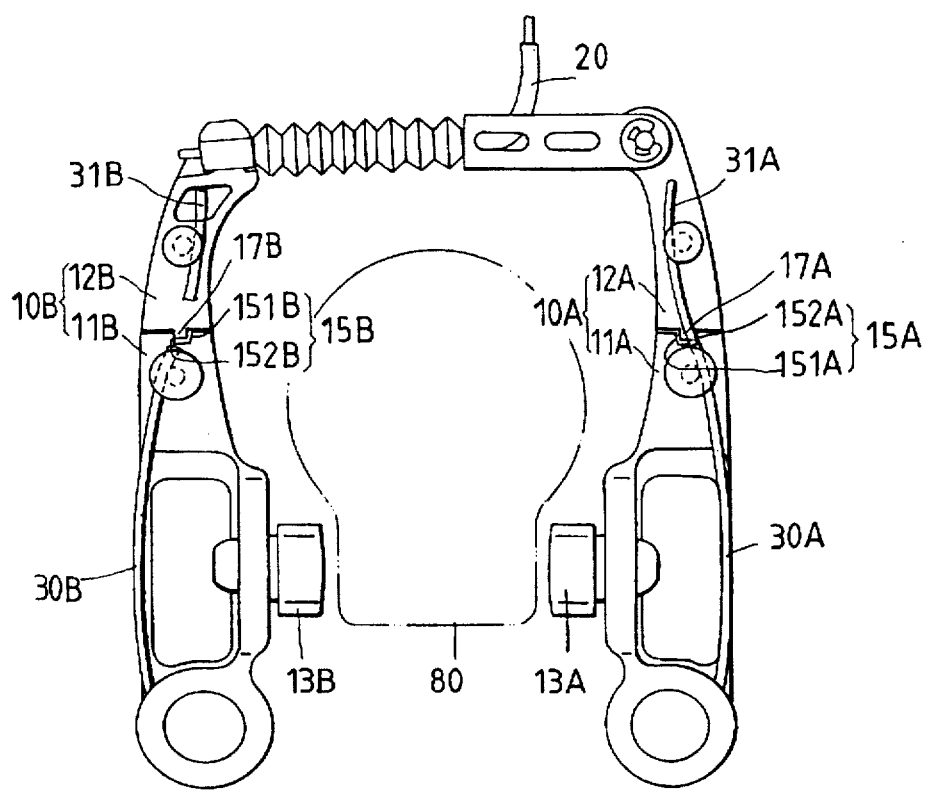
FIG. 8 shows a rear view of a third preferred embodiment of the present invention.

Now referring to FIG. 8, the third preferred embodiment of the present invention differs from the first preferred embodiment of the present invention in that the former comprises the primary arms 11A, 11B, which have the first drag portions 15A, 15B of a recessed construction, and that the first drag portions 15A, 15B of the third preferred embodiment have outer sides 151A, 151B, and inner sides 152A, 152B, and further that the former comprises the secondary arms 12A, 12B, which have the second drag portions 17A and 17B of a protruded construction, with the protuberances of the second drag portions 17A and 17B being smaller than the recesses of the first drag portions 15A and 15B so as to allow the second drag portions 17A and 17B to turn within limits.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A bicycle two-step brake system comprising two brake arms, each of said two brake arms having a primary arm and a secondary arm fastened pivotally with said primary arm such that said secondary arm is fastened with a brake cable of a brake lever of a bicycle, said primary arm being fastened with the frame of the bicycle and provided with a brake shoe fastened therewith for making contact with a wheel rim of the bicycle for slowing or stopping the motion of the bicycle, said primary arm further being provided with a first drag portion corresponding in location to a second drag portion of said secondary arm, said primary arm and said secondary arm provided therebetween with an elastic member capable of providing said first drag portion and said second drag portion with an outward bracing force enabling said primary arm and said secondary arm to move independently or synchronously, in conjunction with a pulling force of said brake cable.

2. The bicycle two-step brake system as defined in claim 1, wherein said first drag portion of each of said primary arms has a linear stopping face; and wherein said second drag portion of each of said secondary arms has a linear stopping face separated from said linear stopping face of said primary arm by a minute interstice enabling said first drag portion and said second drag portion to turn.

3. The bicycle two-step brake system as defined in claim 1, wherein said first drag portion of said primary arm is provided with a recess, an outer side, and an inner side; and wherein said second drag portion of said secondary arm is provided with a protuberance smaller in dimension than said recess of said first drag portion so as to enable said second drag portion to turn within the confine of said first drag portion.

4. The bicycle two-step brake system as defined in claim 1, wherein said primary arms are provided with a pivot; wherein said secondary arms are provided with a shaft; and wherein said elastic members are fitted over said shafts of said secondary arms.

5. The bicycle two-step brake system as defined in claim 4, wherein said elastic members have an extension portion which is fitted over said pivot of said primary arm such that said extension portion urges said shaft of said secondary arm.

6. The bicycle two-step brake system as defined in claim 4, wherein said elastic members are coil springs, with each of said coil springs being fitted over said pivot of said primary arm such that one end of each of said coil springs is fastened with said pivot and that another end of each of said coil springs urges said shaft of said secondary arm.

7. The bicycle two-step brake system as defined in claim 4, wherein said pivot and said shaft are provided respectively with a projection and a stopping disk; and wherein said elastic members are fitted over said projection such that said elastic members are prevented by said stopping disk from becoming disengaged with said projection.

* * * * *